United States Patent [19]

Rüb Winfried

[11] Patent Number: 4,999,579
[45] Date of Patent: Mar. 12, 1991

[54] METHOD AND APPARATUS FOR MEASURING THE ROTATIONAL SPEED OF A SHAFT

[75] Inventor: Rüb Winfried, Neustadt/Main, Fed. Rep. of Germany

[73] Assignee: Manessmann Rexroth GmbH, Lohr/Main, Fed. Rep. of Germany

[21] Appl. No.: 397,963

[22] Filed: Aug. 24, 1989

[30] Foreign Application Priority Data

Aug. 30, 1988 [DE] Fed. Rep. of Germany ....... 3829390

[51] Int. Cl.$^5$ .......................... G01B 7/14; G01P 3/48; G01P 3/54
[52] U.S. Cl. .............................. 324/166; 324/207.25; 324/207.23; 324/207.26
[58] Field of Search ............... 324/166, 168, 173, 174, 324/207, 208

[56] References Cited

U.S. PATENT DOCUMENTS 4,284,916 8/1981 Onodera et al. .................... 324/174

FOREIGN PATENT DOCUMENTS

| | | |
|---|---|---|
| 3215212 | 11/1983 | Fed. Rep. of Germany . |
| 3220896 | 12/1983 | Fed. Rep. of Germany . |
| 3413105 | 10/1984 | Fed. Rep. of Germany . |
| 3401858 | 2/1985 | Fed. Rep. of Germany . |
| 3523250 | 1/1986 | Fed. Rep. of Germany . |
| 3500450 | 10/1986 | Fed. Rep. of Germany . |
| 2062875 | 5/1981 | United Kingdom . |

Primary Examiner—Walter E. Snow
Attorney, Agent, or Firm—Burns, Doane, Swecker & Mathis

[57] ABSTRACT

A method and apparatus are described, for measuring the angular velocity of a measuring body. In accordance with the present invention, the distance of the measuring body from a sensor varies periodically as the body is rotated, whereby the sensor emits a distance signal dependent on the distance, which distance signal is converted to a frequency-dependent signal in a converter circuit to determine angular velocity in a higher rpm region. To determine the angular velocity (or rpm) in a lower rpm region, the derivative of continuously varying distance between the sensor and a surface or partial surface of the measuring body is employed. In this way it is possible to measure rpm over a wide range down practically to zero.

8 Claims, 3 Drawing Sheets

METHOD AND APPARATUS FOR MEASURING THE ROTATIONAL SPEED OF A SHAFT

BACKGROUND OF THE INVENTION

The invention relates to a method and apparatus for measuring the angular velocity (or rpm) of a measuring body, the distance of which body from a sensor varies periodically as the body is rotated, by emitting a distance signal dependent on said distance by the sensor and by converting the distance signal to a frequency-dependent signal in a converter circuit.

Apparatuses of this type for measuring angular velocity are employed in motor vehicles on a large scale, in particular for measuring the rpm of a timing shaft, a crankshaft, a primary shaft of the transmission, or a wheel axle. In such an apparatus for measuring angular velocity, typically, a measuring body in the form of a spur gear generates a periodic distance signal in the sensor device, the frequency of which signal is proportional to the rpm of the measuring body, and which signal is converted in the converter circuit to a frequency-dependent rpm signal. With such known apparatuses for measuring angular velocity, however, it is very difficult to measure very low rpms, because the low frequencies thereby produced cannot be measured rapidly and accurately. If one seeks to alleviate this problem by increasing the number of teeth on the measuring body, one must increase the size of the measuring body (although the sensor may remain the same size); moreover, at high rpm the upper frequency of the converter circuit will soon be reached.

The underlying problem of the present invention is to devise a method and apparatus for measuring the angular velocity (or rpm) of a measuring body, the distance of which body from a sensor varies periodically as the body is rotated, such that it is possible to measure rpm over a wide range including rpm values close to zero.

SUMMARY OF THE INVENTION

This problem is solved according to the invention by providing a method and apparatus for measuring the angular velocity (or rpm) of a measuring body the distance of which body from a sensor varies periodically as the body is rotated, by emitting a distance signal dependent on said distance by the sensor; converting the distance signal to a frequency-dependent signal in a converter circuit; and, employing a varying distance between the sensor and a surface or partial surface of the measuring body for determining the angular velocity (or rpm) in a lower rpm region.

According to the invention, in the region of low rpm the rpm is determined from the continuously varying distance between the sensor and the measuring body.

In the apparatus, the measuring body is configured such that the distance between it and the (fixed) sensor varies continuously, in a pattern which is, e.g. of a sinusoidal or sawtooth shape; and the distance signal emitted by the sensor varies correspondingly. The distance signal is fed to a differentiating circuit, which determines the differential with respect to time (the lateral slope) of the distance signal, and which generates a differential signal corresponding to a certain slope of the distance signal. However, because the lateral slope of the distance signal represents the rpm of the measuring body accurately only at frequencies up to a given upper limit frequency, the differential signal is passed on as the "rpm signal" in an output circuit, in preference to the frequency-dependent signal from the converter circuit, only at frequencies below the limit frequency. The output circuit only passes on the differential signal as the "rpm signal" when the level of the differential signal is below a predetermined limit corresponding to said uppe limit frequency. In this way, the measuring range of the apparatus for measuring angular velocity is broadened toward zero without lowering the upper limit of said measuring range.

The inventive apparatus for measuring angular velocity can thus be used advantageously in drive control (transmission control) systems, starting slip (e.g., traction) control systems and antilock braking systems (ABS), and in such use the operating range of such systems can be extended practically to zero speed of the vehicle.

Additional advantageous features and refinements of the inventive apparatus are also set forth below. For example, according to the invention the output circuit is comprised of a frequency- and/or level-detector with a threshold characteristic and a commutator controlled by the detector, which commutator switches between the output signal of the differentiating circuit and the output signal of the converter circuit, depending on the instantaneously determined angular velocity. Advantageously, the detector has a hysteresis characteristic with regard to the value of the frequency or the value of the level. This serves to avoid unnecessary frequent switching of the rpm signal (between measurement of the slope and of the frequency) in the limit region. The output signal of the detector can also be used to cause the converter circuit to be switched on or off.

Digital or analog means may be used to convert the distance signal (emitted by the sensor) into the differential signal and into the frequency-dependent signal. It is advantageous to provide a smoothing circuit between the inventive apparatus for measuring angular velocity and an evaluation or control device connected downstream of the said measuring apparatus, which smoothing circuit eliminates any step between the differential signal and the frequency-dependent signal.

Any transducer may be used as a sensor, if the transducer can provide a distance signal dependent on the distance to the measuring body. For installation in motor vehicles, preferably inductive transducers are employed, because of their robust construction and their low susceptibility to failure or error.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
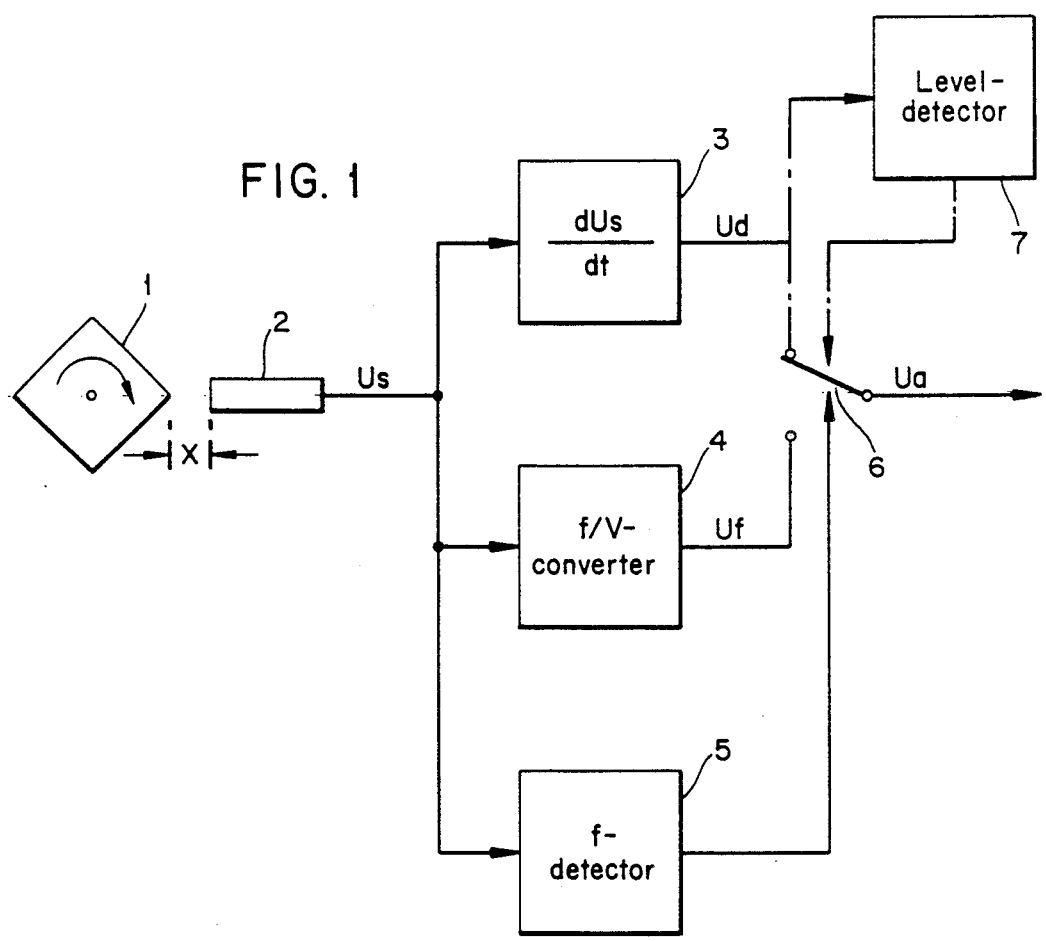
FIG. 1 is a block diagram of the apparatus for measuring angular velocity, according to a certain exemplary embodiment of the present invention.

FIG. 1 is a schematic block diagram of the apparatus for measuring angular velocity according to a first exemplary embodiment of the present invention. This apparatus measures the rpm of a rotating measuring-body 1 which has the shape of a symmetric square. A sensor 2 is fixedly mounted at a certain distance from the axis of measuring body 1. Sensor 2 may be an inductive, capacitive, or ultrasound sensor, of a type which produces a signal proportionate to a distance x from the perimeter of the measuring body 1. Due to the shape of the perimeter of body 1, the distance x to the sensor 2 changes periodically, whereby a distance signal Us is output from the sensor which signal has a frequency proportional to the rpm of the measuring body 1 and is essentially sinusoidal or sawtooth shaped. The distance signal Us is input to a differentiating circuit 3 which differentiates the signal with respect to time and generates a differential signal Ud corresponding to the maximum gradient (slope) of the distance signal Us. In the low rpm region, the maximum slope of the distance signal is a direct measure of the rpm of the measuring body 1. The differentiation may be accomplished by an analog technique, e.g., by means of a so-called operational amplifier and the R-C components connected thereto, or by a digital technique, in predetermined discrete time intervals. The differentiating circuit therefore includes, for example, a differentiating functional unit followed by a peak value holding circuit. The differentiating circuit could also, for example, include an analog-to-digital converter operating at predetermined time intervals over a predetermined time span, and a peak value storage device for temporarily storing the peak value from the converter.

The distance signal Us is also input to a frequency/voltage converter (f/V converter) 4 which generates a signal Uf which is a function of the frequency of the distance signal and which is preferably proportional to said frequency. The f/V converter may be a digital converter wherein the periodic oscillations of the distance signal Us are converted into pulses which are counted over a prescribed time interval, and the count is then converted into a voltage comprising the frequency-dependent signal Uf. The converter 4 may (alternatively) be an analog converter wherein the frequency dependence of reactances is employed. In either case, such a converter does not determine a low frequency of the distance signal Us very well at all, i.e., the determination is inaccurate and has low resolution. Accordingly, at low frequencies (and therefore low rpm), the frequency dependent signal Uf from the converter 4 is not suitable for further evaluation.

The differential signal Ud is thus usable only in the low rpm region, and the frequency-dependent signal Uf is usable only in the higher rpm region. Accordingly, the measuring apparatus of FIG. 1 has an output circuit comprised of a frequency detector (f-detector) 5 and a commutator 6, and/or, as shown by dot-dashed lines, a level detector 7 and the commutator 6. The f-detector receives the distance signal Us and at a predetermined frequency generates a switching signal for the commutator 6, which commutator is shown schematically as a mechanical commutator but is preferably an analog commutator. The level detector 7 detects the level of the differential signal Ud, and at a predetermined level of Ud generates a switching signal for the commutator 6. The switching signal from the detector (5 or 7) is preferably generated with a certain hysteresis with regard to the frequency or level. That is, the detector generates the switching signal if, given a low value, a predetermined higher (threshold) value is reached; and the detector ceases generating the switching signal if, given a higher value, a predetermined lower (threshold) value is reached. This avoids unnecessary frequent switching when operating in the transition region. Normally the output signal (rpm signal) Ua from the commutator 6 is the differential signal Ud from the differentiating circuit 3. As soon as the commutator 6 is switched by the switching signal, the output signal (rpm signal) Ua becomes the frequency-dependent signal Uf from the f/V converter 4. In this way, the rpm signal Ua represents the rpm in a wide range down to near zero rpm, and does so without a substantial lag. The rpm signal is then evaluated, in another circuit; e.g., a drive control system, an ignition or (fuel) injection control system, or an antilock braking system.

Figure 2:
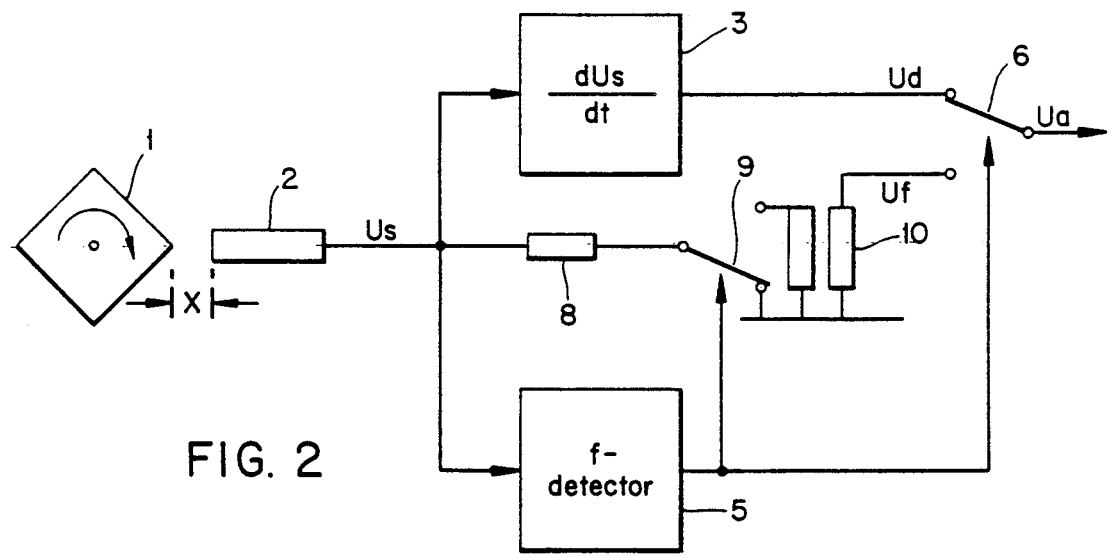
FIG. 2 is a block diagram of the apparatus for measuring angular velocity, according to a second exemplary embodiment of the present invention.

FIG. 2 illustrates a second exemplary embodiment of the apparatus for measuring angular velocity, which differs from the first embodiment in that the frequency-dependent signal Uf is produced by a transformer 10. With this second exemplary embodiment, in the low rpm region the distance signal is received at a resistance 8 and is also fed to the differentiating circuit 3 and the f-detector 5. As soon as the f-detector 5 detects the reaching of a predetermined (threshold) frequency of the distance signal Us, it generates a switching signal for the commutator 6, which signal also controls a second commutator 9. Commutator 9, which normally connects one terminal of the resistance 8 to ground, after receiving the switching signal connects the same terminal to the primary winding of the transformer 10, which winding connects to the ground. In this way the distance signal Us is fed to the series circuit comprised of the resistance 8 and the primary winding of the transformer 10, such that as the frequency of the voltage applied to the transformer 10 is increased the voltage across it increases as well. That voltage induces a frequency-dependent voltage Uf in the secondary winding of the transformer. Beyond the transformer 10 there are rectifying and smoothing elements.

Figure 3:
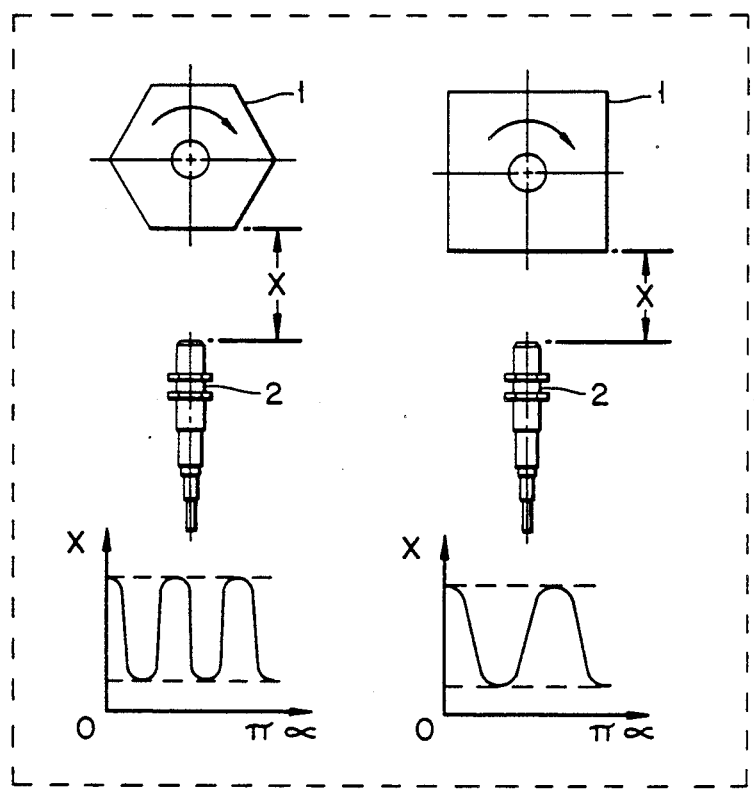
FIG. 3 gives examples of the configurations of measuring bodies in accordance with the present invention and the periodic distance variations which occur when said bodies are rotated.

FIG. 3 illustrates two examples of shapes of the measuring body 1, with respective curves of the variation in distance x of the perimeter of the measuring body from the fixed sensor 2. The measuring body 1 is in the form of respective axially symmetric regular polygons with sharp edges: a hexagon and a square.

Figure 4:
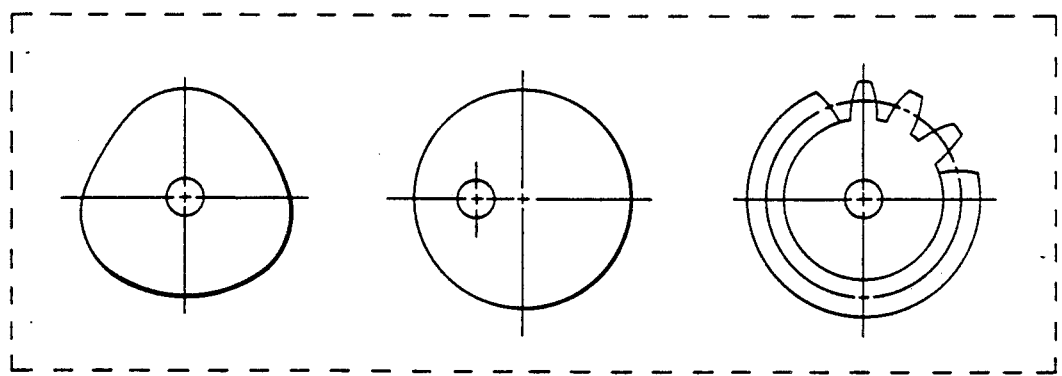
FIG. 4 illustrates other examples of configurations of measuring bodies in accordance with the present invention.

FIG. 4 illustrates additional examples of shapes for the measuring body 1. The first of these is an axially symmetric triangle with heavily rounded edges; the second is an eccentric circle; and the third is a normal spur gear.

Figure 5:
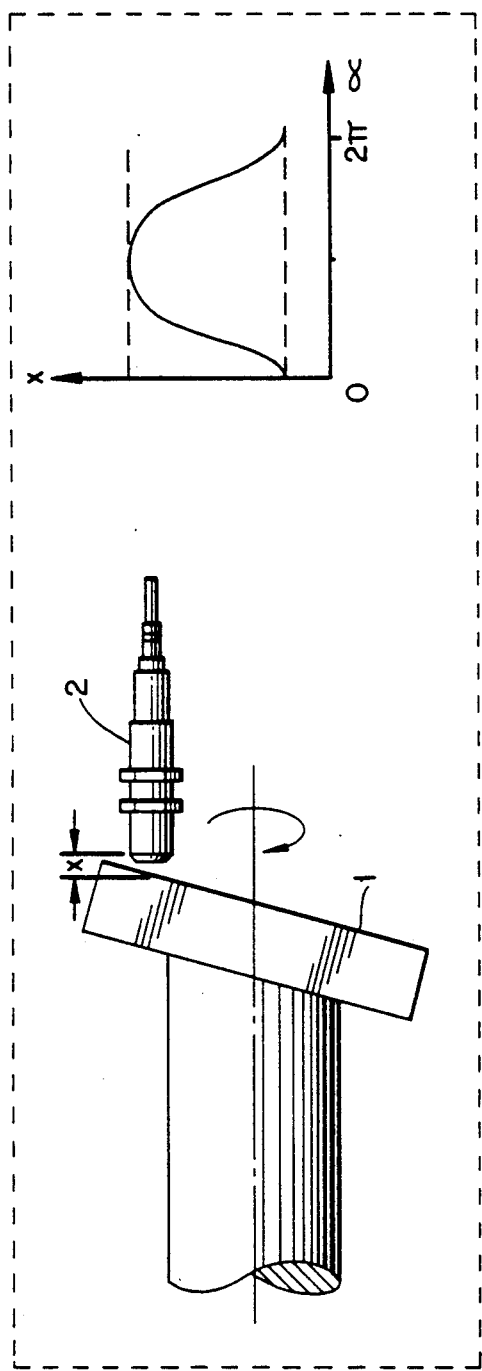
FIG. 5 illustrates an example of a measuring body in accordance with the present invention and distance variations occurring with its rotation.

FIG. 5 illustrates yet another example of the configuration of a measuring body 1, along with the curve of the variation in the distance x. Here the measuring body 1 is in the form of a swashplate disposed at a fixed radial distance to the sensor 2. When the measuring body 1 rotates, the variations in angular position around the shaft axis of the axial end face of the measuring body 1, along a circular path having a radial distance equal to the relative position of the sensor 2, cause the distance x to the sensor to vary correspondingly.

Figure 6:
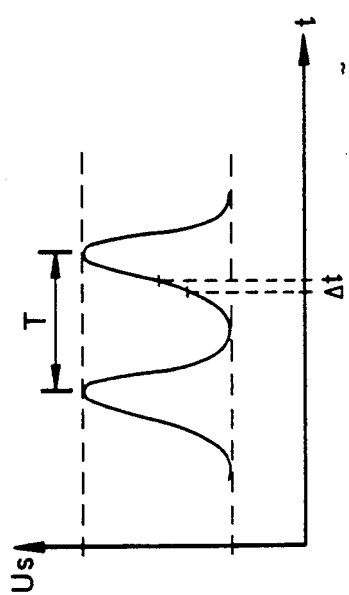
FIG. 6 is a representation for discussing differentiation in discrete time intervals.

In any case the measuring body 1 should be designed such that when it is rotated, the distance x to the sensor 2 varies essentially in a sinusoidal or sawtooth fashion, whereby the lateral slope of the resulting distance signal Us can be used as a measure of the angular velocity (or rpm). An exemplary determination of the lateral slope of the distance signal Us is illustrated in FIG. 6. In this example, the time differentiation of the distance signal Us is based on the determination of the amplitude difference in discrete time intervals $\Delta t$. Such a time differentiation of the periodically changing distance x between the measuring body 1 and the sensor 2 only gives an error-free determination of the angular velocity (or rpm) if the time interval $\Delta t$ for the differentiation is much shorter than the current period T of the distance signal Us. That is, the time interval $\Delta t$ must be, e.g., 0.01 to 0.04 of the period T. In this connection it should be taken into account that the rise rate (and fall rate) of the signal from sensor 2 is limited to a certain value depending on the embodiment of the sensor 2. Above an angular velocity which corresponds to this limiting value of the signal rise rate of the sensor, only the amplitude difference corresponding to this limiting rise rate will be measured —i.e. a constant value, which value will not correspond to the actual angular velocity. Thus, in the apparatus for measuring angular velocity according to the exemplary embodiments, with a certain margin of safety, the system is switched over from slope-based determination of the rpm to frequency-based determination.

The differentiation circuit 3, the f/V-converter 4, and the f-detector 5 (or level detector 7), together with the commutator 6, can be in the form of a microcomputer with corresponding additional functional units such as an analog-to-digital converter, a pulse generator, a digital-to-analog converter, etc. For differentiation, the amplitude values of the distance signal Us are queried at predetermined time intervals, the differences in amplitude values are determined, and the maximum differences are selected. For f/V conversion, pulses are formed from the distance signal Us, the pulses are counted, and the count is converted into the frequency-dependent voltage Uf. The pulse count can also be employed to generate the switching signal for the commutator 6, whereby the switching signal may also bring about switching between a lower and higher pulse count in such a way as to produce the desired hysteresis with regard to the frequency value.

In summary, according to the above description, the angular velocity (or rpm) of the measuring body can be measured accurately and without substantial lag, in a wide range close to zero, so that the rpm signal obtained can be advantageously used in regulation and control systems for vehicles.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A method of measuring the angular velocity (or rpm) of a measuring body the distance of which body from a sensor varies periodically as the body is rotated, comprising the steps of:

emitting a distance signal dependent on said distance by the sensor;

converting the distance signal to a frequency-dependent signal in a converter circuit for determining angular velocity (or rpm) in a first rpm region of operation; and employing a derivative of the varying distance between the sensor and a surface or partial surface of the measuring body as a determination of the angular velocity (or rpm) in a second rpm region, said second rpm region being lower than said first rpm region.

2. An apparatus for measuring the angular velocity (or rpm) of a measuring body the distance of which body from a sensor varies periodically as the body is rotated comprising:

a sensor which emits a distance signal dependent on the distance from the sensor to the measuring body, said sensor being disposed such that when the measuring body is rotated, the distance to a partial surface of the measuring body varies continously;

a converting circuit for converting the distance signal to a frequency-dependent signal in the converter circuit;

a differentiating circuit for time-differentiating the continuously varying distance signal of the sensor, to yield a differential signal; and an output circuit for detecting the frequency of the distance signal and/or the level of the differential signal, and, when said frequency and/or level is below a predetermined value, said output circuit delivers, as the rpm signal, the differential signal instead of the frequency-dependent signal which comes from the converter circuit.

3. An apparatus according to claim 2, wherein the differentiating circuit emits, as the differential signal, a signal corresponding to the maximum slope of the distance signal.

4. An apparatus according to claim 2, wherein the output circuit comprises a detector for detecting the frequency and/or level, and a commutator device, controlled by an output signal of the detector, for switching between the frequency-dependent signal and the differential signal.

5. An apparatus according to claim 4, wherein the detector for the frequency and/or level is of a type which has hysteresis with regard to a value of the frequency and/or of the level, which value brings about the switching.

6. An apparatus according to claim 4, wherein the output of the detector causes the converter circuit to be switched in or out via a commutator device.

7. An apparatus according to claim 2, wherein the differentiating circuit further comprises a differentiating functional unit followed by a peak value holding circuit.

8. An apparatus according to claim 2, wherein the differentiating circuit comprises an analog-to-digital converter operating at predetermined time intervals over a predetermined time span, and a peak value storage device for temporarily storing the peak value from the said converter.

* * * * *